United States Patent Office 3,310,374
Patented Mar. 21, 1967

3,310,374
PROCESS FOR REMOVING IRON FROM
PHOSPHORIC ACID
Bob Posey, Jr., Plaquemine, and Ted E. Varnado, Jr., Baton Rouge, La., assignors to The Dow Chemical Company, Midland, Mich., a corporation of Delaware
No Drawing. Filed Dec. 6, 1962, Ser. No. 242,607
7 Claims. (Cl. 23—165)

This invention relates to a process for removing iron from phosphoric acid and more particularly to the removal of iron from a phosphate liquor obtained by the decomposition of phosphate rock with aqueous hydrochloric acid.

Since phosphoric acid is widely used in food production and in chemical processing, the purity of phosphoric acid is often of crucial concern. Natural phosphate ores often contain appreciable quantities of calcium, fluorine, iron, aluminum, silica, and other impurities. Purification of the phosphoric acid obtained from such ores entails considerable time and expense. Yet unless the impurities are removed, the phosphoric acid is of inferior quality.

In the present large scale, wet-process manufacture of phosphoric acid from phosphate ores, such as fluoroapatite $3Ca_3(PO_4)_2 \cdot CaF_2$, the phosphate ore is decomposed with sulfuric acid and the calcium removed as insoluble calcium sulfate. This process is not applicable to all phosphate ores. For example, the naturally occurring mixture of aluminum and calcium phosphates known as "leached zone ore" must often be removed and discarded from phosphate deposits at great expense since the mixture of aluminum sulfate and phosphoric acid obtained by leaching with sulfuric acid cannot be economically separated.

Although phosphate ores are readily decomposed by hydrochloric acid, the solubility of calcium chloride and other by-products salts in the resulting aqueous phosphate liquor has made recovery of phosphoric acid by conventional technology complex and commercially unattractive. However, recently a commercially feasible method for the recovery of phosphoric acid from the aqueous phosphate liquors obtained by the decomposition of a tricalcium phosphate-containing material with aqueous hydrochloric acid has been developed.

As described in the pending application of R. A. Long and D. A. Ellis, Ser. No. 46,104, filed July 29, 1960, now U.S. Patent 3,072,461 this new and novel method for the economical production of phosphoric acid involves three major steps: (1) decomposing a material containing tricalcium phosphate with aqueous hydrochloric acid; (2) extracting the resulting phosphoric acid from the aqueous liquor with a substantially water-immiscible trialkyl phosphate extractant; and (3) stripping the extracted phosphoric acid from the trialkyl phosphate phase by liquid-liquid extraction with water. This process for the recovery of phosphoric acid can be used with any $Ca_3(PO_4)_2$-containing material or any phosphate rock or ore approaching $Ca_3(PO_4)_2$ in composition. Of particular utility are the naturally occurring phosphate ores, e.g., fluorapatite, chloroapatite, hydroxyapatite, carbapatite, land pebble, brown rock, ambylgonite, monazite, variscite and fairfieldite. This process is also applicable to "leached zone ore" and to phosphate containing iron ores, such as the $Fe_2O_3$-apatite mixed ore common to the Rocky Mountain States.

In the processing of a phosphate rock liquor containing appreciable quantities of iron by the Long and Ellis process, a portion of the iron is carried through the extraction steps and appears as a contaminant in the recovered phosphoric acid. For example, with a typical Florida phosphate liquor containing about 1,500 p.p.m. iron, recovered 30% phosphoric acid contained about 3,000 p.p.m. iron. Furthermore, during prolonged continuous operation of the Long and Ellis process wtih a phosphate liquor having 1,000–3,000 p.p.m. iron, a wax-like material containing iron, silica, phosphoric acid and trialkyl phosphate build up and interfered with the operation of the phosphoric acid stripper. Frequent interruptions of the process were necessary to remove these deposits.

It is therefore an object of the present invention to provide a process for the removal of iron from phosphoric acid. It is an additional object to provide a process for the removal of iron from the aqueous phosphate liquor obtained by the decomposition of a tricalcium phosphate-containing material with hydrochloric acid. A still further object of the present invention is to provide an improved process for economically producing phosphoric acid substantially free of iron from a tricalcium phosphate-containing material.

These and other objects are obtained by treating an aqueous phosphoric acid solution containing iron with a sufficient amount of an oxidizing agent to convert substantially all the iron present to the ferric state (FeIII), and then extracting the resulting solution in the presence of excess hydrochloric acid with an amine extractant consisting essentially of (a) at least one member of the group consisting of water-insoluble organic amines and inorganic acid salts thereof, said amines having the structure:

wherein $R_1$ is selected from the group consisting of benzyl and $C_6$–$C_{20}$ alkyl radicals, and $R_2$ and $R_3$ are individually selected from the group consisting of H, benzyl, and $C_1$–$C_{20}$ alkyl radicals, and (b) a liquid hydrocarbon solvent containing at least 35 weight percent aromatic hydrocarbons.

By this process the iron content of a phosphate liquor is easily reduced to less than 5 p.p.m. No further treatment of the liquor is required before the trialkyl phosphate extraction of the Long and Ellis process and the recovered 30% phosphoric acid contains less than 10 p.p.m. iron. But in addition to the increase in product purity, removal of the iron from the phosphate liquor by amine extraction achieves the further highly desirable result of eliminating completely the build up of interfering deposits in the phosphoric acid stripper.

Although the invention described herein is suitable for removing iron from impure aqueous phosphoric acid, it is particularly advantageous for removing iron from aqueous phosphate liquors containing iron and a high concentration of calcium, such as are obtained by the decomposition of phosphate rock with hydrochloric acid.

The decomposition of phosphate ores with hydrochloric acid in the Long and Ellis process proceeds readily with all common ores. No special preparation of the ore is required, the decomposition being almost equally as rapid with unground ore as with finely pulverized material. Calcined ore may also be used. In practice a 5–10% excess of hydrochloric acid is used calculated on the basis of the phosphate content and the stoichiometry represented by the equation:

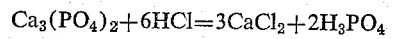

The 5–10% excess of hydrochloric acid calculated on this basis provides sufficient acid for all subsequent steps including the amine extraction. A larger excess of acid is generally unnecessary, but a deficiency of acid results obviously in reduced recoveries of phosphoric acid.

The concentration of hydrochloric acid used in decomposing the phosphate ore is not critical. However, an initial acid concentration of about 7 molar is preferred for convenient handling of the resulting phosphate liquor in subsequent process steps. Ordinarily a reaction time of from 5 to 60 minutes is sufficient to achieve substantially complete decomposition of the phosphate material with hydrochloric acid. Longer reaction times may be employed although additional quantities of impurities and particularly fluorides which concentrate in the insoluble residue may thereby be introduced. After removing the insoluble residue by filtration, decantation, or the like, the resulting phosphate liquor is suitable for treatment to remove iron.

To remove iron from phosphoric acid by the method of this invention, it is essential that the iron be in the ferric state (FeIII). Ferrous iron (FeII) is not removed by the amine extractant under normal conditions. Therefore, the aqueous phosphate liquor or impure phosphoric acid is treated with a sufficient amount of an oxidizing agent to convert substantially all the iron present to FeIII. Although many oxidizing agents are known which will oxidize ferrous to ferric iron in an acidic aqueous solution, such as $KMnO_4$, $K_2S_2O_8$, $MnO_2$, $Na_2Cr_2O_7$, $H_2O_2$, $O_3$, NaOCl, etc., chlorine is preferred for larger scale operations because of its availability, ease of handling, and low cost. Furthermore, chlorine does not introduce any new ions into the process solutions.

In the treatment of aqueous phosphate liquors obtained from commercial Florida phosphate ores, use of about 3 parts of chlorine per 1,000 parts of ore is generally adequate. The treatment is conveniently carried out by passing the desired amount of chlorine into the liquor in a stirred tank. Oxidation is rapid and complete within a few minutes at ordinary temperatures.

Since the metallic anion involved in the extraction process is believed to be the $FeCl_4^-$ ion, it is essential that the aqueous phosphate liquor contain enough chloride ion and hydrochloric acid to permit formation of the $FeCl_4^-$ ion. Thus sufficient hydrochloric acid must be used to provide in the aqueous solution or liquor a mole ratio of HCl to FeIII of at least 4 as well as to neutralize any free amine in the amine extractant.

It has been found that the use of 5–10% excess hydrochloric acid in the decomposition of the phosphate ore provides sufficient chloride ion and excess hydrochloric acid for the amine extraction of FeIII. In removing iron from impure aqueous phosphoric acid it is necessary only to add sufficient hydrochloric acid to provide a mole ratio of HCl to FeIII of at least 4 and to neutralize any free amine in the amine extractant.

To remove the FeIII species from the aqueous phosphoric acid liquor, the liquor is extracted with a solution of a water-insoluble organic amine in a liquid hydrocarbon solvent. The term water-insoluble, as used herein, refers to solubility of less than 1 wt. percent in water at room temperature. To minimize the loss of the extractant to the aqueous phase, not only must the amine be water-insoluble, but the aqueous solubility of the inorganic amine salts, particularly the hydrochloride and phosphates, must also be low. On the other hand, the amines and amine salts must have an adequate solubility in the organic diluent or at least form a stable although possibly colloidal solution with the diluent.

Particularly suitable for use in the process of this invention are the simple, monobasic organic amines having the general structure:

$$R_1R_2R_3N$$

wherein $R_1$ is selected from the group consisting of benzyl and $C_6$–$C_{20}$ alkyl radicals, and $R_2$ and $R_3$ are individually selected from the group consisting of H, benzyl, and $C_1$–$C_{20}$ alkyl radicals. Included among the amines which are effective in the process disclosed herein are primary amines, such as tert-octylamine and tert-dodecylamine; secondary amines, such as di-n-decylamine, di-(2-butyl- octyl)amine, di-(1-isobutyl-3,5-dimethylhexyl)amine, N-benzyl-1-(3-ethylpentyl)-4-ethyloctylamine; and tertiary amines, such as tribenzylamine, tricaprylylamine, tri-n-octylamine, butyldilaurylamine, dimethyloctadecylamine, tri-n-hexylamine, and methyldioctylamine. Commercially available mixture of amines, the individual components of which are encompassed within the above general structures, also may be employed with very satisfactory results.

Although primary and secondary amines are effective extractants, best results are obtained with tertiary amines having a molecular weight within the range from 250 to 600 and such amines are preferred in the process of this invention.

As a diluent for the amine extractant, chlorinated hydrocarbons such as chloroform and trichloroethylene have been used, but liquid hydrocarbon solvents are preferred. Commercial blends or cuts of aromatic and mixed aromatic and aliphatic hydrocarbons available in large quantities are particularly satisfactory. To minimize the loss of solvent, liquid hydrocarbon solvents boiling above 100° C. are preferred.

The water-insoluble amine extractants are generally very soluble in aliphatic hydrocarbon solvents such as kerosene. But when such solutions are used in the FeIII extraction process, three-phase systems often are encountered because of the insolubility of the FeIII-amine complex in either the aqueous or hydrocarbon phase. By using an aromatic solvent such as toluene, xylene, an aromatic naphtha or a hydrocarbon mixture containing at least 35 weight percent aromatic hydrocarbons, such three-phase systems are avoided. The FeIII-amine complex remains in a stable although perhaps colloidal solution in the hydrocarbon phase.

The solubility characteristic of most amine and amine salt mixtures is such that concentrations higher than about 10 weight percent in the organic diluent are not feasible. A 5% solution (about 0.1–0.2 molar) is often advantageous.

The extraction of the FeIII species from the aqueous phosphoric acid solution with a water-insoluble organic amine extractant may be carried out by any conventional extraction technique. Thus it may be performed batchwise in one or more steps until the iron concentration has been reduced to the desired or commercially acceptable level. Alternatively, the process may be carried out continuously with the extraction in countercurrent, cascade, or other suitable continuous manner.

Particularly with initial iron concentrations of less than 5,000 p.p.m., the removal of the FeIII species from the aqueous phosphoric acid solution is rapid and essentially complete with short contact times and just a few extraction stages. In general, contact times from 0.5 to 5 minutes are adequate at ordinary temperatures. The extraction is conveniently carried out at room temperature, but somewhat higher temperatures can be used depending upon solubilities and other characteristics of the extraction system.

While the mole ratio of FeIII to amine in the FeIII-amine complex approaches one, it is generally preferred for rapid and efficient extractions to employ a two to ten-fold excess of the amine. The consumed amine extractant is readily regenerated for recycle by stripping the iron in a separate extractor with water or dilute caustic, or by other suitable means.

Optimum conditions for a particular system within the general teachings of this invention are easily determined by simple trials.

After treatment as described herein to remove iron, the aqueous phosphate liquor obtained by the decomposition of a phosphate ore with hydrochloric acid may be directly processed, as described by Long and Ellis, to produce a purified phosphoric acid highly desirable for commercial use.

This invention is further illustrated by the following examples to which it is not limited.

Example I.—Preparation of phosphate liquor

In a stirred tank 1,509 parts of phosphate ore designated as "Florida Phosphate Rock Run-of-Mine Concentrate" was digested in 6,780 parts of an aqueous solution prepared by adding concentrated hydrochloric acid to a dilute recycle phosphoric acid stream. The acid used in the digestion contained 145 parts $H_3PO_4$, 701 parts $CaCl_2$, and 1,110 parts HCl. The aqueous phosphate liquor from the digestion was separated from the solid residue by settling and decantation. The decanted liquor contained 1,560 p.p.m. iron as determined by the conventional stannous chloride-potassium dichromate method.

Example II.—Removal of iron (A) To 130 parts of the phosphate liquor described in Example I was added 0.15 part of chlorine to oxidize its iron content to FeIII. The resulting solution was then shaken for 2 minutes with 100 parts of a 0.1 molar solution of tricaprylylamine in Solvesso 100, a petroleum fraction from Humble Oil Corporation having a boiling range from 155° to 185° C. and containing about 96% aromatics. The aqueous phase was separated and found by analysis to contain less than 5 p.p.m. iron.

(B) Another portion of phosphate liquor oxidized with chlorine as above was extracted with a solution containing 5% tricaprylylamine, 38% toluene and 57% mineral spirits. The iron content of the phosphate liquor was extracted to less than 5 p.p.m. in 2 stages of batch extraction.

(C) When tested in a similar manner, tribenzylamine, methyldioctylamine and tri(2-butyloctyl)amine also give effective removal of iron from the phosphate liquor.

Example IV.—Pilot plant operation

In a pilot plant operation, 6,000 lbs. of Florida phosphate rock were digested with 12,100 lbs. of 37% HCl and 10,800 lbs. of an aqueous recycle stream. After the digestion was complete the aqueous phase was decanted from the insoluble residue giving 26,700 lbs. of phosphate liquor. This liquor was treated with 17 lbs. of chlorine and extracted at about 22° C. with a solution of 840 lbs. of tricaprylylamine in 16,000 lbs. of aromatic naphtha in a two stage continuous mixer-settler apparatus to remove substantially all the iron. The aqueous phase was then passed into a continuous six stage mixer-settler apparatus and extracted with a 50% solution of tributyl phosphate in kerosene. Subsequently the organic phase was scrubbed with a small amount of phosphoric acid-laden aqueous strip solution and then contacted with demineralized water in a five stage mixer-settler apparatus. The final 30% aqueous phosphoric acid was analyzed and found to be substantially free of calcium and iron.

The composition of aqueous streams at several points during this process is given in Table I.

TABLE I.—COMPOSITION OF PHOSPHATE STREAMS

|  | Rock Liquor | Rock Liquor After Amine Extraction | Product Acid |
|---|---|---|---|
| $H_3PO_4$ | 12.2% | 12.2% | 30.0%. |
| Ca | 8.8% | 8.8% | 40 p.p.m. |
| Fe | 1,350 p.p.m. | 4 p.p.m. | 10 p.p.m. |
| F | 4,100 p.p.m. | 4,100 p.p.m. | 400 p.p.m. |
| Al | 415 p.p.m. | 385 p.p.m. | 8 p.p.m. |
| Mg | 150 p.p.m. | 100 p.p.m. | 2 p.p.m. |
| Mn | 30 p.p.m. | 20 p.p.m. | 2 p.p.m. |
| $(SiO_2)_x$ | 700 p.p.m. | 100 p.p.m. | 80 p.p.m. |

We claim:

1. A method for removing iron from an aqueous phosphoric acid solution containing iron which consists essentially of:
   (1) treating said solution with a sufficient amount of an oxidizing agent to convert substantially all the iron present to FeIII;
   (2) adding sufficient chloride to provide in the aqueous solution a mole ratio of HCl to FeIII of at least four; and
   (3) extracting FeIII from the solution, with an amine extractant consisting essentially of:
      (a) at least one member of the group consisting of water-insoluble organic amines and inorganic salts thereof, said amines having the structure:

$$R_1R_2R_3N$$

wherein $R_1$ is selected from the group consisting of benzyl and $C_6$–$C_{20}$ alkyl radicals, and $R_2$ and $R_3$ are independently selected from the group consisting of H, benzyl, and $C_1$–$C_{20}$ alkyl radicals, and
      (b) a liquid hydrocarbon solvent containing at least 35 weight percent aromatic hydrocarbons.

2. The process of claim 1 wherein the organic amine is further characterized as a tertiary amine having a molecular weight in the range from 250 to 600.

3. In a process for the recovery of the phosphate values from a calcium phosphate-containing material wherein the calcium phosphate material is decomposed with hydrochloric acid to give a phosphate liquor containing dissolved iron, the phosphoric acid is extracted from the phosphate liquor with a substantially water-immiscible trialkyl phosphate, and the phosphoric acid is stripped from the trialkyl phosphate phase by liquid-liquid extraction with water, the improvement which consists essentially in removing a substantial portion of the iron from the phosphate liquor prior to the trialkyl phosphate extraction by:
   (1) treating said liquor with a sufficient amount of an oxidizing agent to convert substantially all the iron present to FeIII;
   (2) adding sufficient chloride to provide in the aqueous solution a mole ratio of HCl to FeIII of at least four; and
   (3) extracting FeIII from the liquor, with an amine extractant consisting essentially of:
      (a) at least one member of the group consisting of water-insoluble organic amines and inorganic salts thereof, said amines having the structure:

$$R_1R_2R_3N$$

wherein $R_1$ is selected from the group consisting of benzyl and $C_6$–$C_{20}$ alkyl radicals, and $R_2$ and $R_3$ are independently selected from the group consisting of H, benzyl, and $C_1$–$C_{20}$ alkyl radicals, and
      (b) a liquid hydrocarbon solvent containing at least 35 weight percent aromatic hydrocarbons.

4. The process of claim 3 wherein the alkyl amine extractant is further characterized as a tertiary amine having a molecular weight in the range of from 250 to 600.

5. The process of claim 3 wherein the extractant is tricaprylylamine.

6. The process of claim 3 wherein the oxidizing agent is chlorine.

7. The process of claim 3 wherein the liquid hydrocarbon solvent is an aromatic naphtha.

References Cited by the Examiner

UNITED STATES PATENTS

| 306,664 | 10/1884 | Thomas et al. | 23—165 |
| 2,336,448 | 12/1943 | Cox | 23—165 |
| 2,955,918 | 10/1960 | Ruehrwein | 23—165 |
| 2,968,528 | 1/1961 | Tuttle et al. | 23—165 |
| 3,072,461 | 1/1963 | Long et al. | 23—165 |
| 3,129,170 | 4/1964 | Ittlinger | 210—54 |

(Other references on following page)

OTHER REFERENCES

Coleman et al.: "Amine Salts as Solvent Extraction Reagents for Uranium and Other Metals," Proceedings of International Conference of Peaceful Uses of Atomic Energy, volume 28, pages 278–288.

Wilson et al.: "Solvent Extraction With Quaternary Ammonium Halides," Analytical Chemistry, volume 34, No. 2, February 1962, pages 203–207.

References Cited by the Applicant

UNITED STATES PATENTS

| | | |
|---|---|---|
| 1,642,244 | 9/1927 | Howard. |
| 2,880,063 | 3/1959 | Baniel et al. |

OTHER REFERENCES

Good et al.: J. Am. Chem. Soc., 82, 5636 (1960).

OSCAR R. VERTIZ, *Primary Examiner.*

O. F. CRUTCHFIELD, *Assistant Examiner.*